United States Patent
Hu et al.

(10) Patent No.: US 10,488,205 B2
(45) Date of Patent: Nov. 26, 2019

(54) METHOD AND SYSTEM FOR UPDATING MAPS BASED ON CONTROL FEEDBACKS OF AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Sen Hu, Sunnyvale, CA (US); Fan Zhu, Sunnyvale, CA (US); Qi Kong, Sunnyvale, CA (US); Qi Luo, Sunnyvale, CA (US); Xiang Yu, Sunnyvale, CA (US); Zhenguang Zhu, Beijing (CN); Xiaoxin Fu, Beijing (CN); Jiarui He, Beijing (CN); Hongye Li, Beijing (CN); Yuchang Pan, Beijing (CN); Zhongpu Xia, Beijing (CN); Chunming Zhao, Beijing (CN); Guang Yang, San Jose, CA (US); Jingao Wang, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 160 days.

(21) Appl. No.: 15/532,861

(22) PCT Filed: May 22, 2017

(86) PCT No.: PCT/CN2017/085272
§ 371 (c)(1),
(2) Date: Jun. 2, 2017

(87) PCT Pub. No.: WO2018/213969
PCT Pub. Date: Nov. 29, 2018

(65) Prior Publication Data
US 2019/0003839 A1    Jan. 3, 2019

(51) Int. Cl.
*G01C 21/32*    (2006.01)
*G05D 1/00*    (2006.01)
(Continued)

(52) U.S. Cl.
CPC .......... *G01C 21/32* (2013.01); *B60W 40/072* (2013.01); *G05D 1/0088* (2013.01);
(Continued)

(58) Field of Classification Search
CPC ............... G01C 21/32; B60W 40/072; B60W 2520/16–18; G05D 1/0088; G05D 2201/0213; C06F 17/30241
(Continued)

(56) References Cited

U.S. PATENT DOCUMENTS 6,401,027 B1 * 6/2002 Xu ................... G08G 1/0104
340/988
9,227,635 B1 * 1/2016 Takamatsu ........... B62D 5/0466
(Continued)

*Primary Examiner* — Thomas G Black
*Assistant Examiner* — Wae L Louie
(74) *Attorney, Agent, or Firm* — Womble Bond Dickinson (US) LLP

(57) ABSTRACT

In one embodiment, when an ADV is driving on a road segment, a driving parameter is recorded in response to a first control command. A difference between the first driving parameter and a target driving parameter corresponding to the first control command is determined. In response to determining that the difference exceeds a predetermined threshold, a second control command is issued to compensate the difference and cause the ADV to drive with a second driving parameter closer to the target driving parameter. A slope status of the road segment is derived based on at least the second control command. Map data of a map corresponding to the road segment of the road is updated based on the derived slope status. The updated map can be utilized to generate and issue proper control commands in view of
(Continued)

the slope status of the road when the ADV drives on the same road subsequently.

20 Claims, 12 Drawing Sheets

(51) Int. Cl.
    *G06F 16/29*     (2019.01)
    *B60W 40/072*     (2012.01)
    *G05D 1/02*     (2006.01)

(52) U.S. Cl.
    CPC ........... *G05D 1/0274* (2013.01); *G06F 16/29* (2019.01); *B60W 2520/16* (2013.01); *B60W 2520/18* (2013.01); *G05D 2201/0213* (2013.01)

(58) Field of Classification Search
    USPC .......................................................... 701/45
    See application file for complete search history.

(56) References Cited

U.S. PATENT DOCUMENTS

| | | |
|---|---|---|
| 2014/0032087 A1* | 1/2014 | Shiri .................. G06F 17/00 701/117 |
| 2017/0030728 A1* | 2/2017 | Baglino ............. G01C 21/3469 |
| 2017/0045137 A1* | 2/2017 | Dufford .............. F16H 61/0213 |
| 2017/0080931 A1* | 3/2017 | D'Amato ............ B60W 30/143 |
| 2017/0219364 A1* | 8/2017 | Lathrop ............. G01C 21/3453 |
| 2017/0277716 A1* | 9/2017 | Giurgiu .............. G06F 16/2365 |
| 2017/0301232 A1* | 10/2017 | Xu .................... G08G 1/096775 |
| 2018/0107216 A1* | 4/2018 | Beaurepaire .......... B60W 50/08 |
| 2018/0188727 A1* | 7/2018 | Zhuang .............. B60W 50/035 |
| 2018/0194286 A1* | 7/2018 | Stein ..................... B60W 10/22 |
| 2018/0231387 A1* | 8/2018 | Thiel .................. G01C 21/3602 |
| 2018/0239032 A1* | 8/2018 | Thiel .................. G01C 21/30 |
| 2018/0276485 A1* | 9/2018 | Heck ....................... G06N 7/005 |
| 2018/0304900 A1* | 10/2018 | Luo ..................... B60W 40/068 |
| 2018/0347993 A1* | 12/2018 | Hermiz ................. G01C 21/32 |
| 2018/0348755 A1* | 12/2018 | Yamaguchi .......... G08G 1/0112 |
| 2019/0003839 A1* | 1/2019 | Hu ......................... G01C 21/32 |

\* cited by examiner

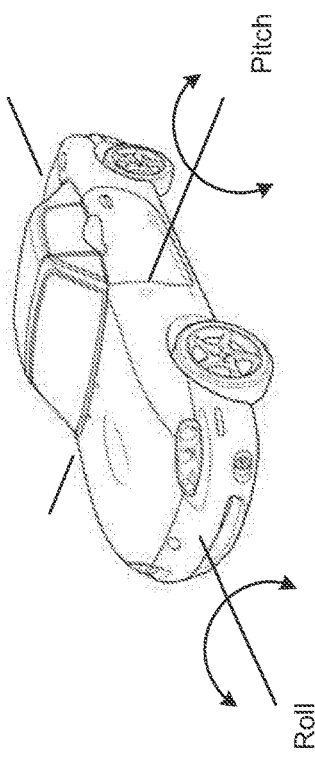
FIG. 4A
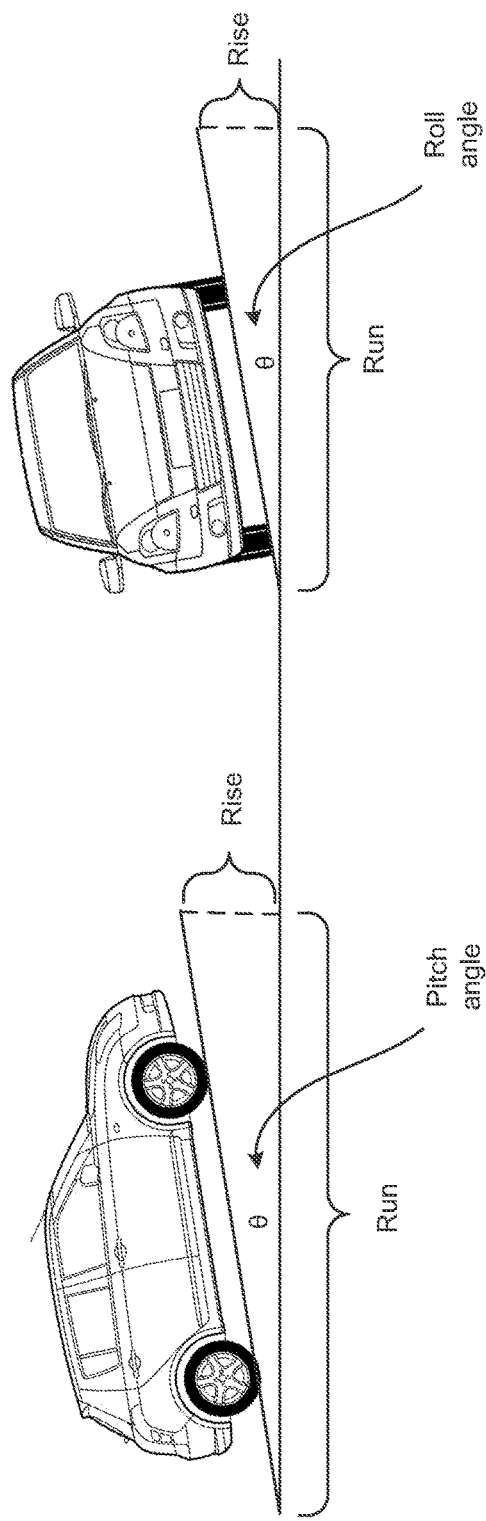
FIG. 4B
FIG. 4C

| Control Command 501 | Driving Parameter 502 | Slope Status 503 |
|---|---|---|
| ... | ... | ... |
| | | |
| | | |
| | | |
| | | |
| ... | ... | ... |

| Throttle/Brake Command 601 | Speed 602 | Pitch Status 603 |
|---|---|---|
| ... | ... | ... |
| 20% | 10 m/s | 0 |
| 25% | 10 m/s | 1% |
| 30% | 10 m/s | 2% |
| 35% | 10 m/s | 3% |
| ... | ... | ... |

| Steering Command 651 | Heading Direction 652 | Roll Status 653 |
|---|---|---|
| ... | ... | ... |
| | | |
| | | |
| | | |
| | | |
| ... | ... | ... |
| | | |

FIG. 6B

METHOD AND SYSTEM FOR UPDATING MAPS BASED ON CONTROL FEEDBACKS OF AUTONOMOUS DRIVING VEHICLES

CROSS-REFERENCE TO RELATED APPLICATION

This patent application is a U.S. National Phase Application under 35 U.S.C. § 371 of International Application No. PCT/CN2017/085272, filed May 22, 2017, entitled "METHOD AND SYSTEM FOR UPDATING MAPS BASED ON CONTROL FEEDBACKS OF AUTONOMOUS DRIVING VEHICLES," which is incorporated by reference herein by its entirety.

TECHNICAL FIELD

Embodiments of the present invention relate generally to operating autonomous driving vehicles. More particularly, embodiments of the invention relate to updating maps based on control feedbacks of autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors and maps and route information, allowing the vehicle to travel with minimal human interaction or in some cases without any passengers.

Motion planning and control are critical operations in autonomous driving. For example, throttle, brake, and steering commands are most important commands in autonomous driving, which may be generated based on maps and route information. Correct and up-to-date maps, especially high definition maps, are essential to autonomous driving. However, road surfaces may change and collection of map data may be incorrect or inaccurate. It is expensive to update the road condition using a sensor such as an inertia measurement unit. There has been a lack of efficient ways to update the maps regarding the road condition.

SUMMARY

Embodiments of the present disclosure provide a computer-implemented method for updating maps for autonomous driving, a non-transitory machine-readable medium, and a data processing system.

In an aspect of the disclosure, the computer-implemented method for updating maps for autonomous driving comprises: recording a first driving parameter of an autonomous driving vehicle (ADV) driving on a segment of a road in response to a first control command; determining a difference between the first driving parameter and a target driving parameter corresponding to the first control command; issuing a second control command to compensate and cause the ADV to drive with a second driving parameter closer to the target driving parameter, in response to determining that the difference exceeds a predetermined threshold; deriving a slope status of the segment of the road based on at least the second control command; and updating map data of a map corresponding to the segment of the road based on the derived slope status.

In another aspect of the disclosure, the non-transitory machine-readable medium has instructions stored therein, which when executed by a processor, cause the processor to perform operations. The operations comprises: recording a first driving parameter of an autonomous driving vehicle (ADV) driving on a segment of a road in response to a first control command; determining a difference between the first driving parameter and a target driving parameter corresponding to the first control command; issuing a second control command to compensate and cause the ADV to drive with a second driving parameter closer to the target driving parameter, in response to determining that the difference exceeds a predetermined threshold; deriving a slope status of the segment of the road based on at least the second control command; and updating map data of a map corresponding to the segment of the road based on the derived slope status.

In a further aspect of the disclosure, the data processing system comprises: a processor; and a memory coupled to the processor to store instructions, which when executed by the processor, cause the processor to perform operations. The operations include: recording a first driving parameter of an autonomous driving vehicle (ADV) driving on a segment of a road in response to a first control command; determining a difference between the first driving parameter and a target driving parameter corresponding to the first control command; issuing a second control command to compensate and cause the ADV to drive with a second driving parameter closer to the target driving parameter, in response to determining that the difference exceeds a predetermined threshold; deriving a slope status of the segment of the road based on at least the second control command; and updating map data of a map corresponding to the segment of the road based on the derived slope status.

In a further aspect of the disclosure, the computer-implemented method for updating maps for autonomous driving comprises: receiving driving statistics of a plurality of vehicles recorded when the vehicles were driving on a plurality of roads, wherein the driving statistics includes control commands issued to the vehicles and responses of the vehicles in response to the control commands at different points in time; for a given segment of a road, identifying one or more control commands that were issued to one or more of the vehicles to compensate prior control commands of the vehicles in order for the vehicles to maintain one or more target driving parameters associated with the control commands; deriving a slope status of the segment of the road based on the control commands and the target driving parameters; and updating map data of a map location of a map corresponding to the segment of the road.

BRIEF DESCRIPTION OF THE DRAWINGS

Embodiments of the invention are illustrated by way of example and not limitation in the figures of the accompanying drawings in which like references indicate similar elements.

FIGS. 4A-4C are diagrams illustrating slope statuses of vehicles or roads.

FIG. 5 is a block diagram illustrating an example of a slope status to command mapping table according to one embodiment of the invention FIG. 6A is a block diagram illustrating an example of a pitch status to command mapping table according to one embodiment of the invention.

FIG. 6B is a block diagram illustrating an example of a roll status to command mapping table according to one embodiment of the invention.

DETAILED DESCRIPTION

Figure 1:
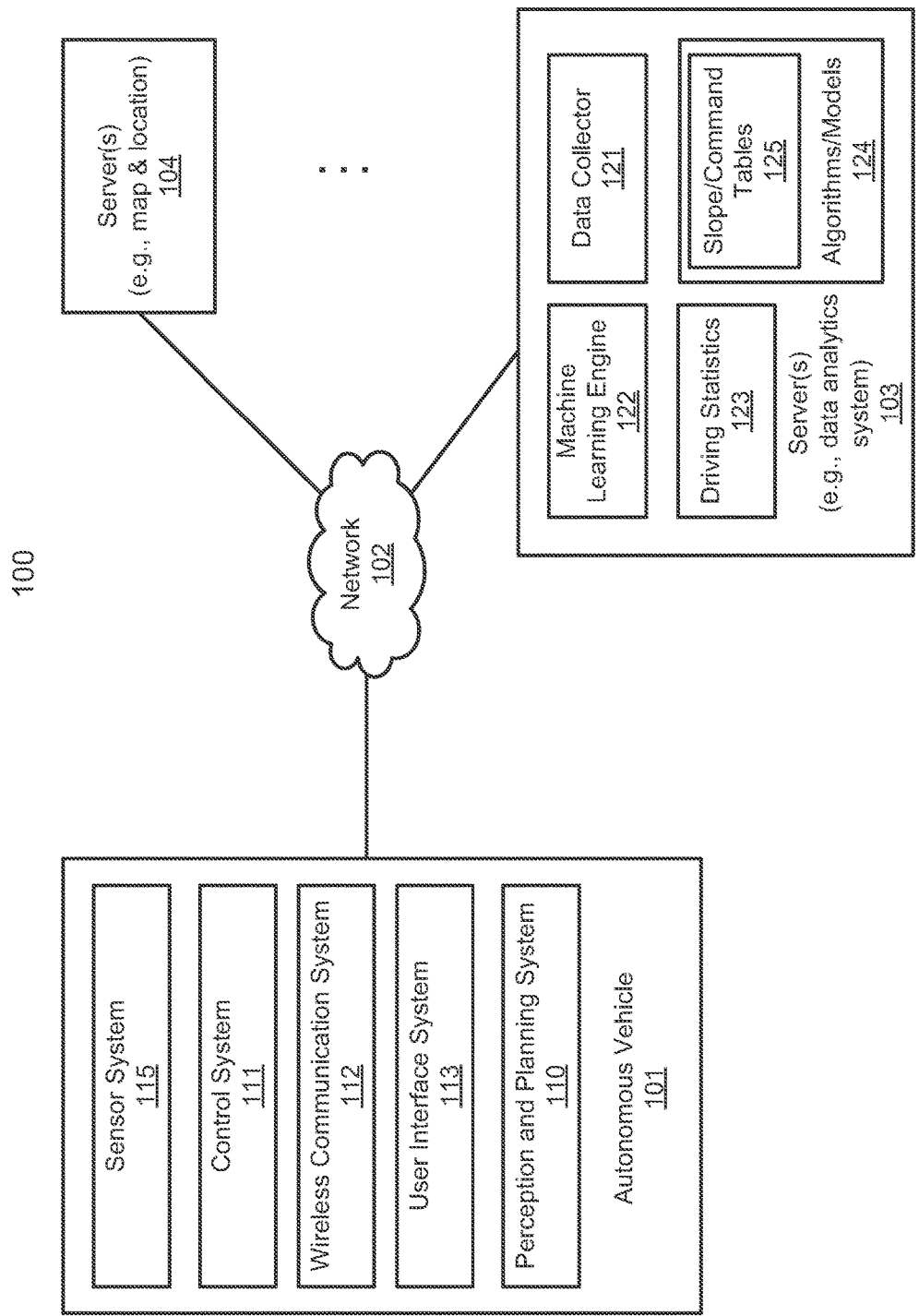
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one aspect of the invention, instead of using expensive sensors to determine a slope status of a road, a control feedback is utilized to estimate the slope status when an autonomous driving vehicle (ADV) is driving on that particular road. In one embodiment, when an ADV is driving on a particular road segment of a road, a control command (e.g., speed control command, steering command) is issued to the ADV based on planning and control data to drive the ADV to reach a target state (e.g., target speed, target acceleration, target heading direction). Responses of the ADV are recorded and compared to target information of the driving. If the response of the ADV is off from the target, an additional control command may be issued to compensate the error.

Based on the additional control command, a slope status of the road segment may be estimated. Such an estimation may be based on the assumption that an ADV normally would not be off much from a target if the ADV is driving on a flat road. When the ADV is off the target, it may be due to the slope status of the road. By using the control feedback of the vehicle, the slope status of the road can estimated and the map data of a map corresponding to that particular road segment may be updated, for example, to indicate that particular road segment may be a sloped road segment, without having to use expensive sensors for the same purpose. The updated map may be utilized subsequently for issuing proper control commands when driving on the same road segment by considering the slope status of the road segment to drive the vehicle as close as possible to the target.

In one embodiment, when an ADV is driving on a road segment, a driving parameter (e.g., speed, acceleration, heading direction) is recorded in response to a first control command (e.g., speed control command, steering command). A difference between the first driving parameter and a target driving parameter corresponding to the first control command is determined, where the difference represents an error off the target due to the slope of the road. In response to determining that the difference exceeds a predetermined threshold, a second control command is issued to compensate the difference and cause the ADV to drive with a second driving parameter closer to the target driving parameter. A slope status of the road segment is derived based on at least the second control command or the difference between the first control command and the second control command. Map data of a map corresponding to the road segment of the road is updated based on the derived slope status. The updated map can be utilized to generate and issue proper control commands in view of the slope status of the road when the ADV drives on the same road subsequently.

In deriving the slope status of the road segment, according to one embodiment, a lookup operation is performed in a slope to command (slope/command) mapping data structure such as a table to search and locate a mapping entry that approximately matches the second control command and the target driving parameter. The slope status is obtained from the matching entry of the slope/command mapping table. The slope/command mapping table includes a number of mapping entries. Each mapping entry maps a particular slope status to a particular control command and a particular driving parameter, or vice versa. The slope/command mapping table can be implemented in a variety of data structures or databases.

In one embodiment, a slope/command mapping table may be created based on a large amount of driving statistics of a variety of vehicles driving on a variety of different types of roads, including flat roads and sloped roads. The vehicles may be driven autonomously or by a variety of human drivers. The driving statistics may include different control commands (e.g., speed control commands, steering commands) issued and responses of the vehicles (e.g., acceleration/deceleration, heading directions) recorded at different points in times when the vehicles were driving on a variety of different types of roads, including flat roads and sloped roads. In one embodiment, a slope/command mapping table includes a pitch status to command (pitch/command) mapping table and a roll status to command (roll/command) mapping table. The pitch/command mapping table includes a number of pitch mapping entries. Each pitch mapping entry maps a speed control command (e.g., throttle/brake command) and a speed or acceleration/deceleration of the vehicle to a pitch status, or vice versa. The roll/command mapping table includes a number of roll mapping entries. Each roll mapping entry maps a steering command and a heading direction or angle of the vehicle to a roll status, or vice versa. Slope/command mapping table can further include other mapping tables for other driving parameters.

According to another aspect of the invention, the driving statistics of a number of ADVs are captured and collected. The driving statistics records the control commands issued to the vehicles and the responses of the vehicles in response to the commands at different points in time and on different roads. The captured commands may include the control commands that were generated to compensate the errors due to the slope status of the roads. The driving statistics are then analyzed at a data analytics system offline to derive the slope status of at least some of the roads and the corresponding map data of those roads is updated based on the slope status. Alternatively, each of the vehicles updates its own local map. The local maps of the vehicles are then sent to a centralized system to be merged into a global map and the global map is then redistributed back to the vehicles for future usage.

According to one embodiment, driving statistics of a number of vehicles are collected, where the driving statistics includes a variety of control commands issued to the vehicles and responses of the vehicles in response to the control commands. For a given road segment, one or more control commands are identified that were issued to one or more vehicles to compensate prior control commands of the vehicles in order for the vehicles to maintain one or more target driving parameters associated with the control commands. A slope status of the road segment is derived based on the control commands and the target driving parameters. Map data of a map corresponding to the road segment is updated based on the slope status.

A sloped road can be a longitudinal sloped road such as an uphill/downhill road, a cross sloped road such as a tilted left/right road, or a combination of both. A slop status may include a pitch status and/or a roll status of the road at a given point in time. A slope status may be represented by a slope angle or slope percentage. Similarly, a pitch status can be represented by a pitch angle or pitch percentage and a roll status can be represented by a roll angle or roll percentage. A flat road refers to a road with an approximately zero slope status. A driving parameter can include a speed, an acceleration rate and/or a heading direction, as well as other driving parameters.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
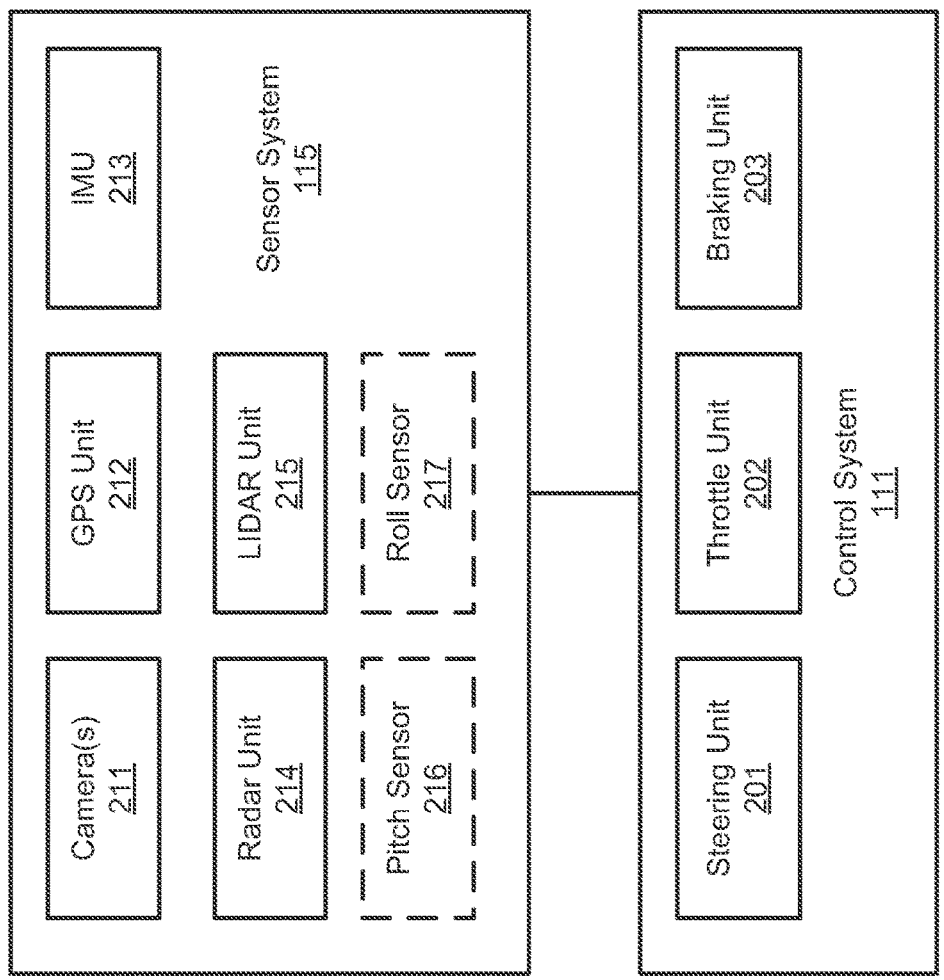
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, sensor system 115 can optionally include pitch sensor 216 and a roll sensor 217. Pitch sensor 216 is configured to sense and determine a pitch angle of the vehicle, which represents a pitch status of the road. Roll sensor 217 is configured to sense and determine a roll angle of the vehicle, which represents a roll status of the road. Pitch sensor 216 and roll sensor 217 may be integrated as a single sensor. Alternatively, the pitch status and roll status can be determined based on GPS/map information and/or IMU data. Note that the pitch status and/or roll status of a road may be determined based on control feedbacks without having to use these sensors or IMU, which will be described in details further below.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information recording the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Driving statistics 123 further include slope statuses such as pitch status and roll status of the roads on which the vehicles were driving when the commands and responses of the vehicles were captured. A slope status may be presented by a slope percentage or a slope angle. Similarly, a pitch status may be represented by a pitch angle or pitch percentage and a roll status may be represented by a roll angle or roll percentage.

In one embodiment, driving statistics 123 may be recorded when the vehicles were driving on certain roads with known slope statuses such as known pitch status and known roll status (e.g., an uphill road or downhill road with a known uphill angle or downhill angle respectively). Driving statistics 123 includes information indicating that in order to maintain a certain driving parameter on a known sloped road, which may be measured by sensors, GPS/map data, and/or an IMU, a certain control command has to be issued. For example, driving statistics 123 may include information indicating that in order to maintain a particular speed, or acceleration or deceleration of a vehicle driving on an uphill or downhill road, a certain speed control command such as a throttle command or a brake command has to be issued. Similarly, driving statistics 123 may include information indicating that in order to maintain a particular heading direction of a vehicle on a cross sloped road, a certain steering control command has to be issued.

Based on driving statistics 123, machine learning engine 122 generates or trains a set of rules, algorithms, and/or predictive models 124 for a variety of purposes. In one embodiment, machine learning engine 122 analyzes driving statistics 123 and generates slope/command mapping data structures or tables 125 for a variety of vehicles. A slope/command mapping table includes a number of mapping entries. Each mapping entry maps a particular control command and a driving parameter to a slope status, or vice versa. Each mapping entry indicates that in order to maintain the corresponding driving parameter of a vehicle driving on a sloped road with the corresponding slope status, the corresponding control command has to be issued. Note that different slope/command tables may configured for different types of vehicles, as different kinds of vehicles may be configured differently (e.g., different weights, dimensions, horse powers, minimum turning radius). Alternatively, a single slope/command table may be configured for multiple types of vehicles. Slope/command mapping tables 125 can then be uploaded onto ADVs to be used in real-time for autonomous driving of the ADVs for the purpose of estimating a slope status of a road based on control feedbacks, where the slope status can then be utilized to update map data of a map corresponding to the road.

Alternatively, the mapping tables 125 may be implemented as machine learning predictive or determination models. The inputs provided to a predictive or determination model can include a control command and a driving parameter, and an output of the predictive or determination model can be a slope status. There can be a pitch/command predictive model and a roll/command predictive model. Inputs to a pitch/command predictive model can include a speed control command (e.g., throttle or brake command) and a driving parameter (e.g., speed, acceleration or deceleration), and an output of the pitch/command model can be a pitch status of the road (e.g., a longitudinal grade/slope percentage or angle). Inputs to a roll/command predictive model can include a steering command and a heading direction, and an output of the roll/command predictive model can be a roll status of the road (e.g., a cross grade/slope percentage or angle).

Figure 3:
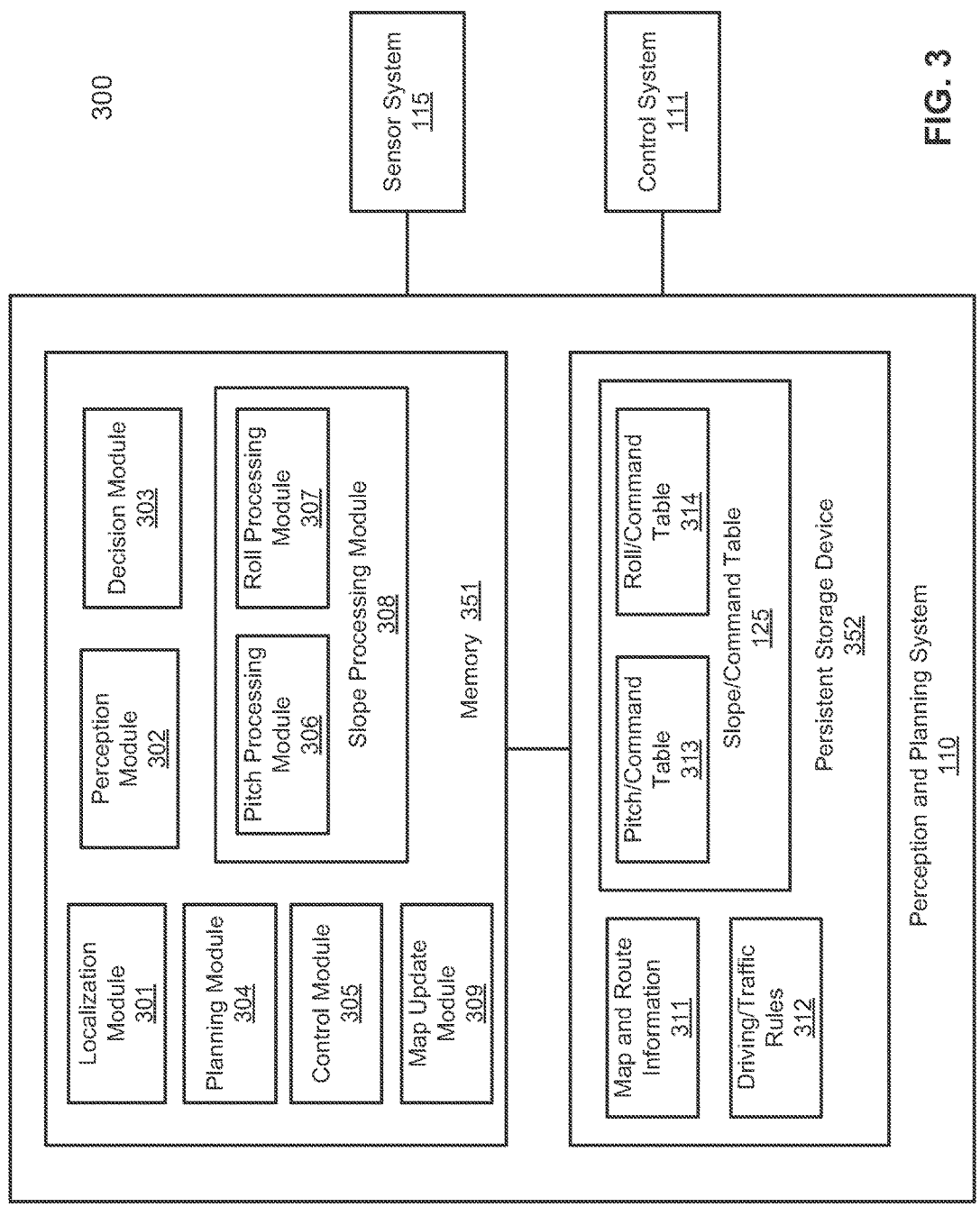
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, control module 305, slope processing module 308, and map update module 309. Slop processing module 308 may include pitch processing module 306 and roll processing module 307 for processing pitch status and roll status respectively.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module. For example, pitch processing module 306 and roll processing module 307 may be integrated with control module 305 and/or planning module 304.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 304 plans a next route segment or path segment, for example, including a target position and the time required for the ADV to reach the target position. Alternatively, planning module 304 may further specify the specific speed, direction, and/or steering angle, etc. In one embodiment, planning module 304 plans a route segment or path segment for the next predetermined period of time such as 5 seconds. For each planning cycle, planning module 304 plans a target position for the current cycle (e.g., next 5 seconds) based on a target position planned in a previous cycle. Control module 305 then generates one or more control commands (e.g., throttle, brake, steering control commands) based on the planning and control data of the current cycle.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment of the invention, instead of using expensive sensors to determine a slope status of a road, a control feedback is utilized to estimate a slope status of a road when an autonomous driving vehicle (ADV) is driving on that particular road. In one embodiment, when an ADV is driving on a particular road segment of a road, control module 305 issues a control command (e.g., speed control command, steering command) to the ADV based on planning and control data to drive the ADV to reach a target state (e.g., target speed, target acceleration, and/or target heading direction). Responses of the ADV are recorded and compared to target information of the driving. If the response of the ADV is off from the target, control command 305 issues an additional control command to compensate the error, such that the vehicle can drive with a driving parameter closer to the intended target driving parameter.

Based on the additional control command, control module 305 invokes slope processing module 308 to determine or estimate a slope status of the road segment. Slope processing module 308 utilizes slope/command mapping table 125 to estimate the slope status of the road based on the additional control command and the target driving parameter. Such an estimation may be based on the assumption that an ADV normally would not be off much from the target if the ADV is driving on a flat road. When the ADV is off the target, it may be due to the slope status of the road. By using the control feedback of the vehicle, the slope status of the road can be estimated. Based on the estimated slope status, map update module 309 updates map data 311 of a map corresponding to that particular road segment, for example, to indicate that particular road segment may be a sloped road segment. The updated map may be utilized subsequently for issuing proper control commands when driving on the same or similar road segment by considering the slope status of the road segment to drive the vehicle as close as possible to the target.

In one embodiment, when an ADV is driving on a road segment, a first driving parameter (e.g., speed, acceleration, heading direction) is recorded in response to a first control command (e.g., speed control command, steering command) issued by control module 305. The driving parameter may be measured using at least some of the sensors of sensor system 115. A difference between the first driving parameter and a target driving parameter corresponding to the first control command is determined. In response to determining that the difference exceeds a predetermined threshold (e.g., the vehicle is off from the target), control module 305 issues a second control command to compensate the difference and cause the ADV to drive with a second driving parameter closer to the target driving parameter. Slope processing module 308 determines a slope status of the road segment based on at least the second control command, for example, using slope/command mapping table 125. Based on the slope status, map update module 309 updates map data 311 of a map corresponding to the road segment of the road is updated. The updated map can be utilized to generate and issue proper control commands in view of the slope status of the road when the ADV drives on the same road subsequently.

In deriving the slope status of the road segment, according to one embodiment, slope processing module 308 performs a lookup operation in slope/command mapping table 125 to search and locate a mapping entry that approximately matches the second control command and the target driving parameter. The slope status is obtained from the matching entry of the slope/command mapping table. FIG. 5 is a block diagram illustrating an example of a slope to command mapping table according to one embodiment of the invention. In one embodiment, slope/command mapping table 125 includes a number of mapping entries. Each mapping entry maps a particular control command 501 and a particular driving parameter 502 to a slope status 501, or vice versa.

In deriving the slope status, slope processing module 308 looks up in slope/command mapping table 125 based on the second control command and the target driving parameter to locate a mapping entry that has field 501 exactly or approximately matching the second control command and field 502 exactly or approximately matching the target driving parameter. Once the matching entry is found, a slope status can be obtained from field 503 of the matching entry. The slope status is then utilized to update map data 311 corresponding to the road segment. Note that slope/command mapping table 125 can be implemented in a variety of data structures, databases, or predictive models.

In one embodiment, slope/command mapping table 125 may be created by a data analytics system (e.g., data analytics system 103) based on a large amount of driving statistics of a variety of vehicles driving on a variety of different types of roads, including flat roads and sloped roads. The vehicles may be driven autonomously or by a variety of human drivers. The driving statistics may include different control commands (e.g., speed control commands, steering commands) issued and responses of the vehicles (e.g., speed, acceleration or deceleration, heading directions) recorded at different points in times when the vehicles were driving on a variety of different types of roads, including flat roads and sloped roads.

In one embodiment, slope processing module 308 includes a pitch processing module 306 and a roll processing module 307, which may be invoked by slope processing module 308 to determine a pitch status and a roll status of a road. Slope/command mapping table 125 includes a pitch status to command (pitch/command) mapping table 313 and a roll status to command (roll/command) mapping table 314. An example of pitch/command mapping table 313 is shown in FIG. 6A and an example of roll/command mapping table 314 is shown in FIG. 6B. Referring to FIGS. 6A and 6B, pitch/command mapping table 313 includes a number of pitch mapping entries. Each pitch mapping entry maps a speed control command (e.g., throttle/brake command) 601 and a speed of the vehicle 602 to a pitch status 603. In one embodiment, an acceleration may be used in place of the speed in field 602. The roll/command mapping table 314 includes a number of roll mapping entries. Each roll mapping entry maps a steering command 651 and a heading direction or angle of the vehicle 652 to a roll status 653. The data of the entries in pitch/command mapping table 313 and roll/command mapping table 314 may be collected and populated by a data analytics system (e.g., data analytics system 103) based on a large amount of driving statistics collected from a variety of vehicles driving at different points in time.

Referring now to FIGS. 4A-4C, a pitch status refers to the up and down orientation of the vehicle such as whether the vehicle is positioned on an uphill position or a downhill position (e.g., whether the frontend of a vehicle is tilted up or down). The pitch status may be represented by a pitch slope angle or a pitch grade/slope percentage as shown in FIG. 4B. A positive pitch angle represents an uphill road and a negative pitch angle represents a downhill road, or vice versa. A roll status refers to whether the vehicle is tilted or rolled left or right. The roll status may be represented by a roll slope angle or a roll grade/slope percentage as shown in FIG. 4C. A positive roll angle represents a road tilted left and a negative roll angle represents a road tilted right, or vice versa. A slope angle ($\theta$) can be determined based on a tangent relationship between rise and run, where tan($\theta$)=rise/ run. A slope percentage can be determined by 100*(rise/ run). Either a slope angle or a slope percentage can be utilized as a pitch status or roll status throughout this application.

Referring back to FIG. 6A, in this example, it is assumed that when a vehicle is driving on a flat road, in order to maintain the speed of the vehicle at 10 meter per second (m/s), a throttle command of 20% pedal value is needed. Assuming the vehicle is driving on a sloped road, when the same throttle command is used, the speed of the vehicle may be off the target speed of 10 m/s. In order to maintain the same speed as of the target speed, a throttle command of 30% pedal value is applied to compensate the slope of the road. The goal is to determine the status of the road without having to use expensive sensors.

In one embodiment, based on the additional throttle command of 30% and the target speed of 10 m/s, pitch processing module 306 looks up in pitch/command mapping table 313 to search and find a mapping entry that has field 601 approximately matching throttle command of 30% and field 602 approximately matching speed of 10 m/s. In this example, matching entry 610 is found. From matching entry 610, a slope status can be obtained from field 603, i.e., slope status of 2%. The slope status of 2% is then utilized to update map data of a map corresponding to the road segment to indicate that the road segment is a sloped road segment of 2% slope grade.

Similarly, a roll status of a road segment can be determined using roll/command mapping table 314 as shown in FIG. 6B using similar techniques as described above. Referring now to FIG. 6B, when control module 305 detects that the heading direction of an ADV is off the target heading direction in response to a first steering command, control module 305 issues a second steering control command to compensate the error so that the ADV can be driven with a heading direction closer to the target heading direction. Based on the second steering command and the target heading direction, roll processing module 307 is invoked to look up in roll/command mapping table 314 to search and locate an entry that has field 651 exactly or approximately matching the second steering command and field 652 exactly or approximately matching the target heading direction. A roll status is obtained from field 653 of the matching entry.

Figure 7:
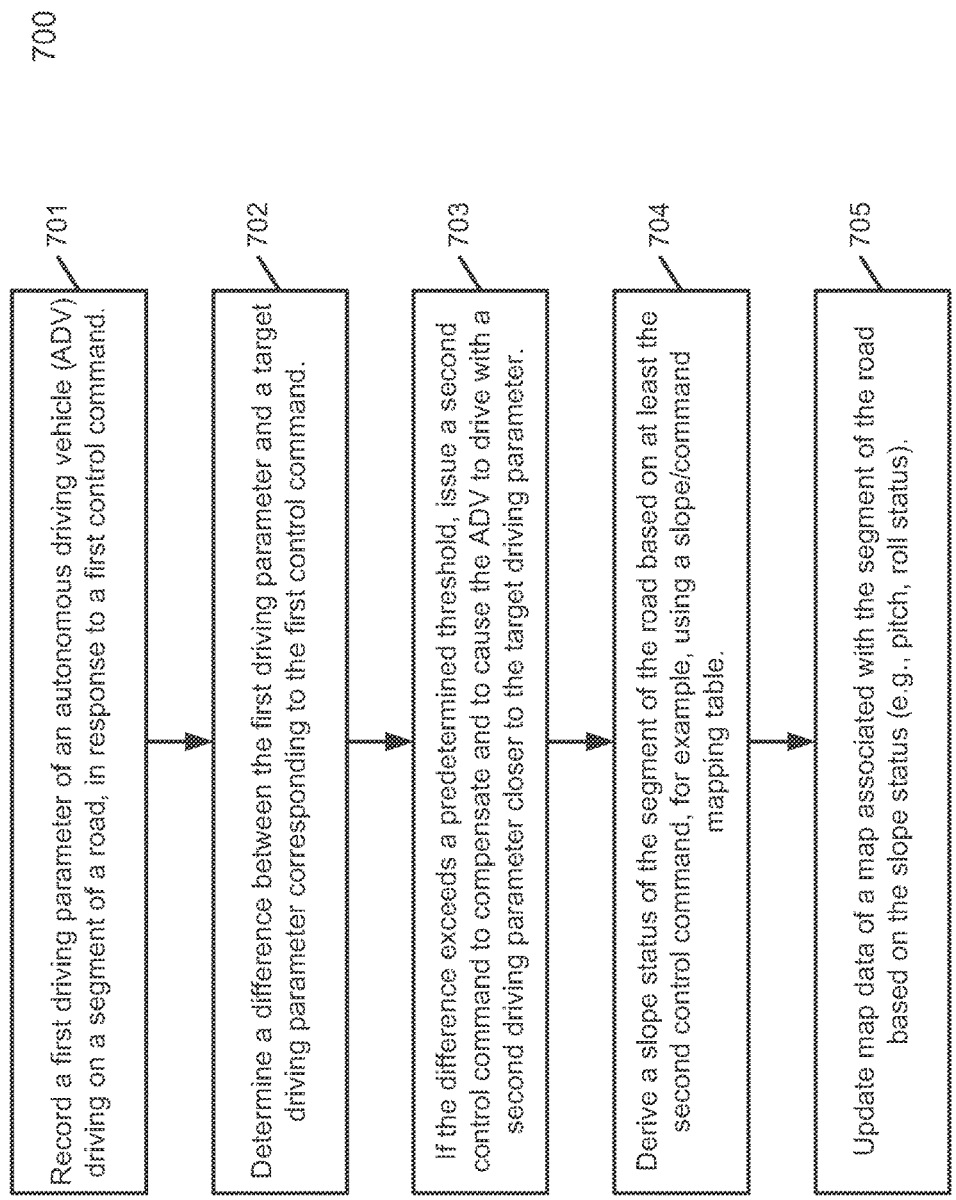
FIG. 7 is a flow diagram illustrating a process of updating maps for autonomous driving according to one embodiment of the invention.

FIG. 7 is a flow diagram illustrating a process of updating maps for autonomous driving according to one embodiment of the invention. Process 700 may be performed by processing logic which may include software, hardware, or a combination thereof. For example, process 700 may be performed by control module 305, slope processing module 308, and/or map update module 309. Referring to FIG. 7, in operation 701, processing logic records a first driving parameter (e.g., speed, acceleration, heading direction) of an ADV driving on a segment of a road, in response to a first control command (e.g., speed control command, steering command). In operation 702, processing logic determines a difference between the first driving parameter and a target driving parameter corresponding to the first control command. If the difference exceeds a predetermined threshold, in operation 703, processing logic issue a second control command to compensate and to cause the ADV to drive with a second driving parameter closer to the target driving parameter. In operation 704, processing logic derives a slope status of the road segment based on the second control command and the target driving parameter. In operation 705, map data of a map associated with the road segment is updated based on the slope status.

Figure 8:
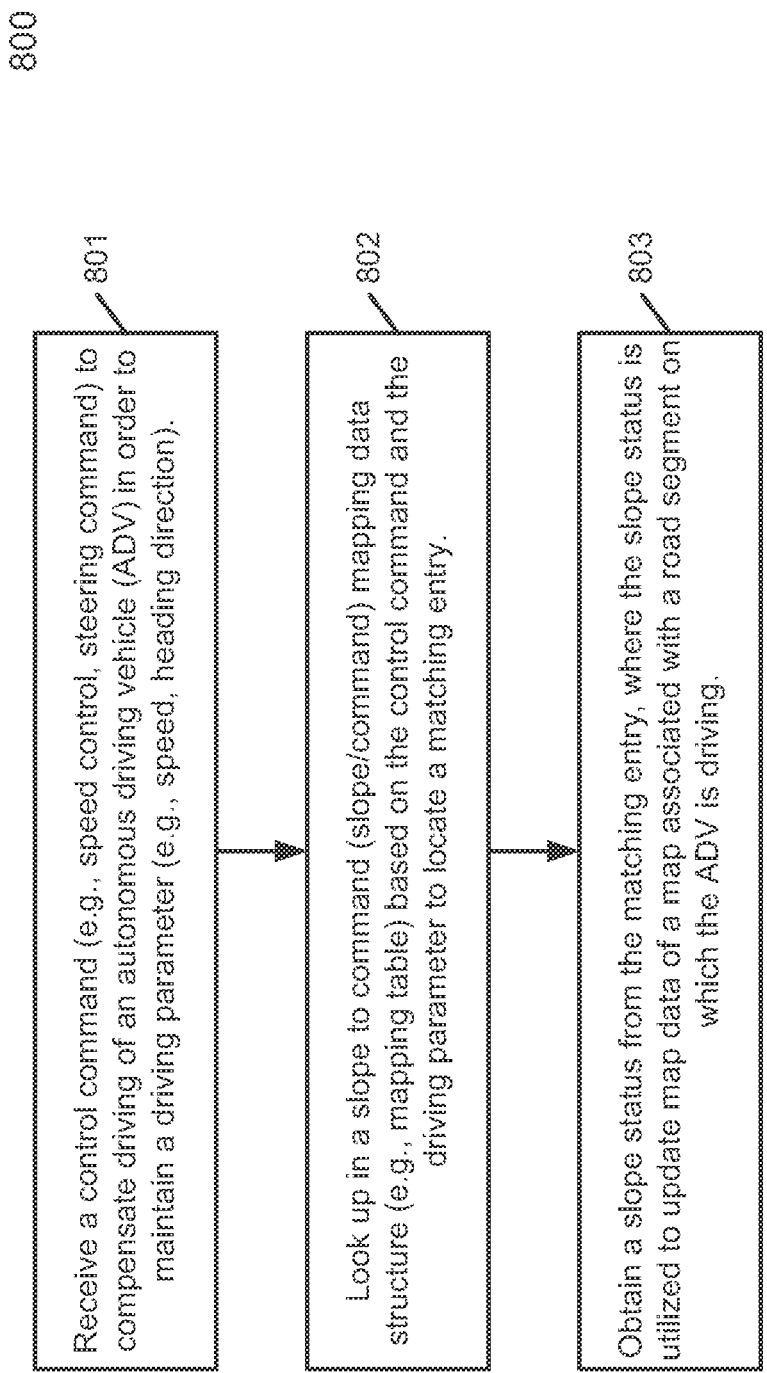
FIG. 8 is a flow diagram illustrating a process of updating maps for autonomous driving according to another embodiment of the invention.

FIG. 8 is a flow diagram illustrating a process of updating maps for autonomous driving according to another embodiment of the invention. Process 800 may be performed by processing logic which may include software, hardware, or a combination thereof. For example, process 800 may be performed as part of operation 704 of FIG. 7. Referring to FIG. 8, in operation 801, a control command (e.g., speed control command, steering command) is received to compensate driving of an ADV in order to maintain a driving parameter (e.g., speed, acceleration, heading direction). In operation 802, a lookup operation is performed in a slope/ command mapping table based on the control command and the driving parameter to search and locate a mapping entry that exactly or approximately matches the control command and the driving parameter. The slope/command mapping table includes a number of mapping entries. Each mapping entry maps a particular control command and a particular driving parameter to a slope status. In operation 803, a slope status is obtained from the matching entry, where the slope status is utilized to update map data of a map associated with a road segment on which the ADV is driving.

The map update techniques described above are performed individually within each ADV. However, according to another aspect of the invention, the driving statistics of a number of ADVs are captured and collected. The driving statistics records the control commands issued to the vehicles and the responses of the vehicles in response to the commands at different points in time and on different roads. The captured commands may include the control commands that were generated to compensate the errors due to the slope status of the road. The driving statistics are then sent to and analyzed at a data analytics system offline to derive the slope status of some of the roads and the corresponding map data of those roads is updated based on the slope status. Alternatively, each of the vehicles updates its own local map. The local maps of the vehicles are then sent to a centralized system to be merged into a global map and the global map is then redistributed back to the vehicles for future usage.

Figure 9:
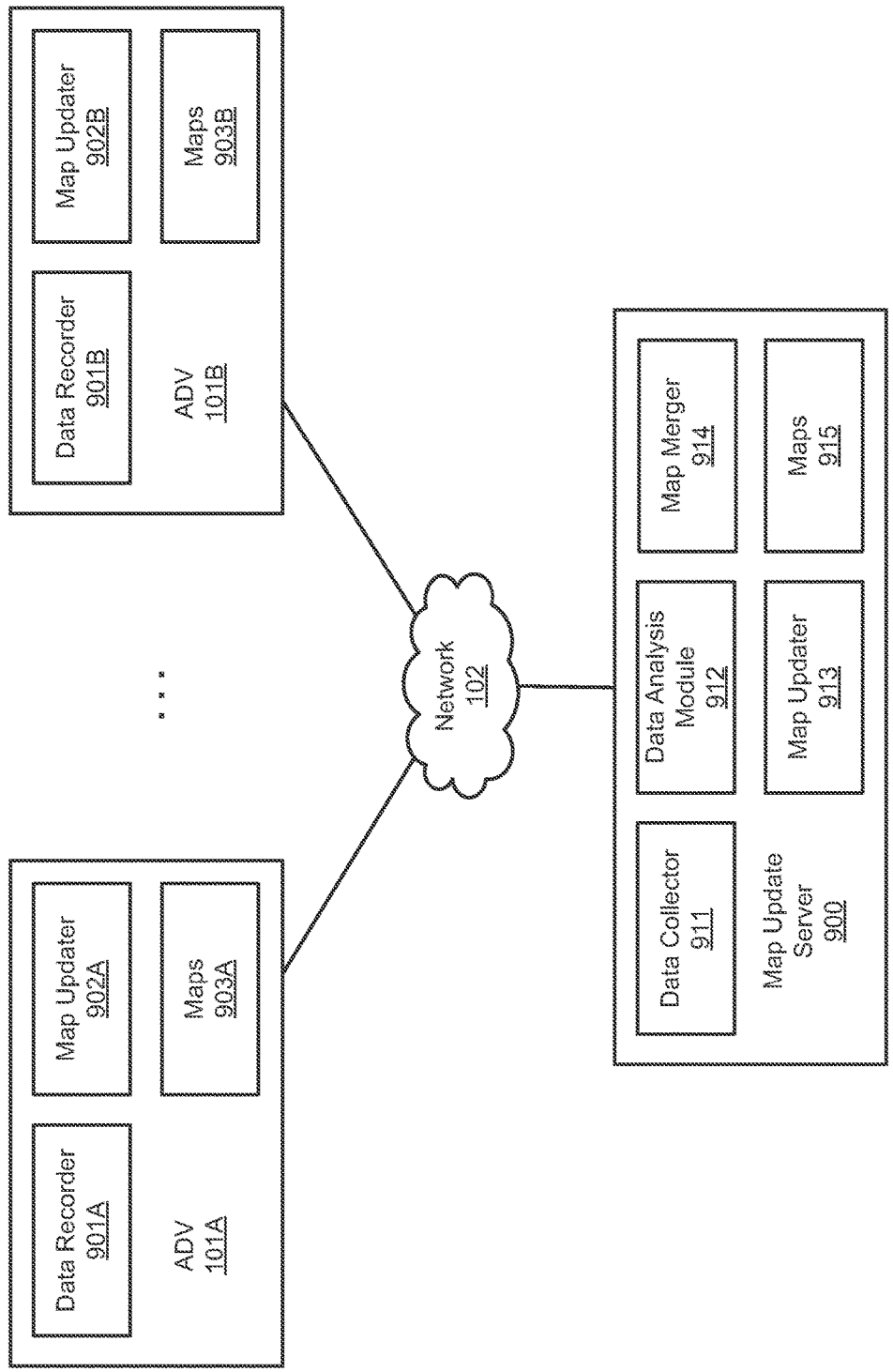
FIG. 9 is a block diagram illustrating a system for updating map according to another embodiment of the invention.

FIG. 9 is a block diagram illustrating a system for updating map according to another embodiment of the invention. Referring to FIG. 9, a number of ADVs 101A-101B are communicatively coupled to a data analytics system as a map update server 900 over network 102. Each of the ADVs 101A-101B includes a data recorder (e.g., data recorders 901A-901B) to capture and record driving statistics when the ADVs are driving on a variety of types of roads, including flat roads and sloped roads. The driving statistics are then transmitted to and collected by data collector 911 of server 900. Data analysis module 912 analyzes the driving statistics to determine or derive slope statuses of different roads using at least some of the techniques described above. Based on the slope statuses, map updater 913 is configured to update maps 915.

According to another embodiment, each of ADVs 101A-101B determines slope statuses of the roads on which the ADV is driving. Each of ADVs 101A-101B includes a map updater (e.g., map updaters 902A-902B) to update their respective local maps (e.g., local maps 903A-903B). The local maps 903A-903B are then transmitted to and received by map merger 914. Map merger 914 is configured to merge or integrate the received local maps into maps 915 as global maps. The updated maps 915 are then redistributed back to the ADVs 101A-101B for future autonomous driving. Note that components 911-914 may be implemented in software, hardware, or a combination thereof.

Figure 10:
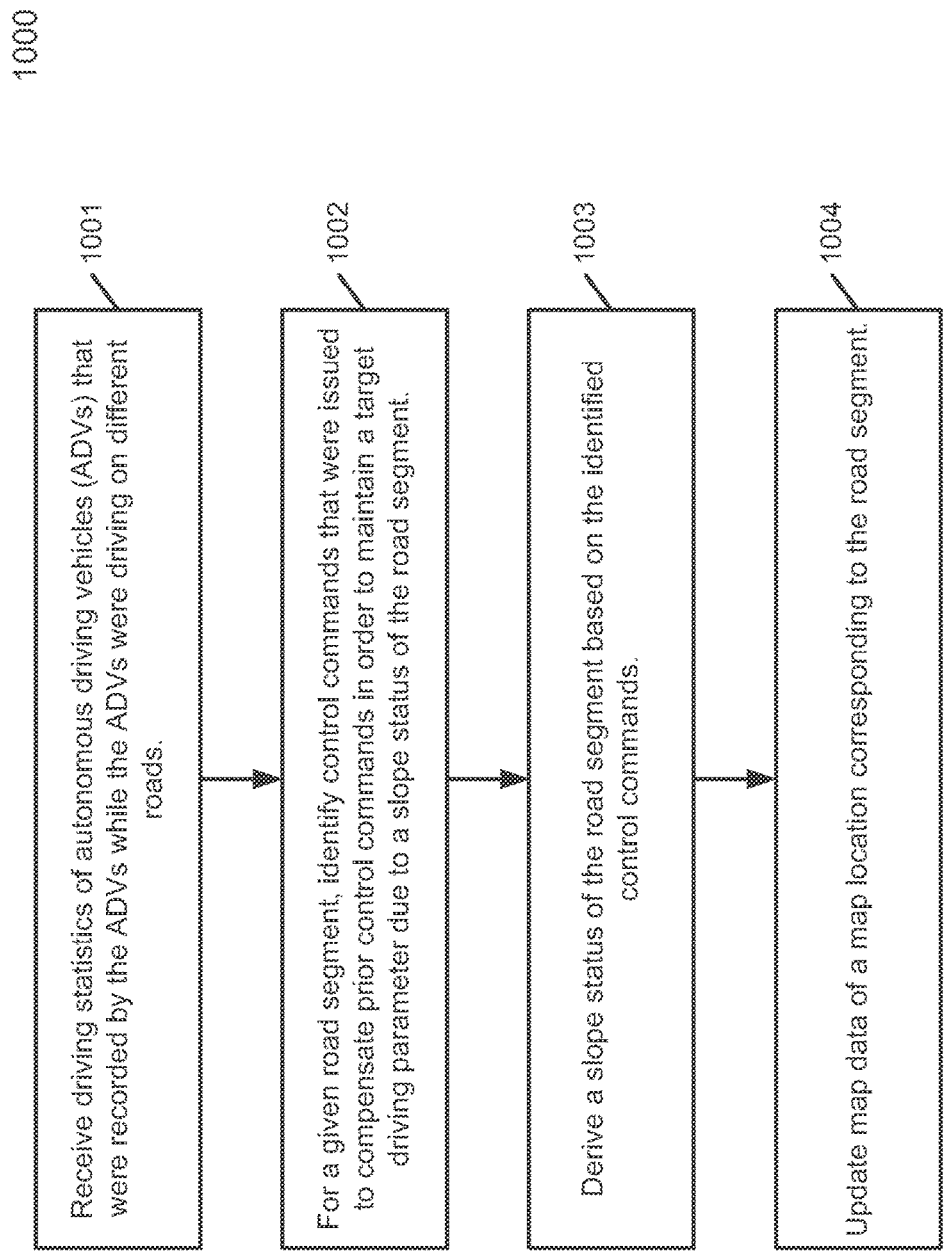
FIG. 10 is a flow diagram illustrating a process of updating maps for autonomous driving according to another embodiment of the invention.

FIG. 10 is a flow diagram illustrating a process of updating maps according to another embodiment of the invention. Process 1000 may be performed by processing logic which may include software, hardware, or a combination thereof. For example, process 1000 may be performed by map update server 900 of FIG. 9. Referring to FIG. 10, in operation 1001, driving statistics of a number of vehicles are collected, where the driving statistics includes a variety of control commands issued to the vehicles and responses of the vehicles in response to the control commands. For a given road segment, in operation 1002, one or more control commands are identified that were issued to one or more vehicles to compensate prior control commands of the vehicles in order for the vehicles to maintain one or more target driving parameters associated with the control commands. In operation 1003, a slope status of the road segment is derived based on the control commands and the target driving parameters. In operation 1004, map data of a map corresponding to the road segment is updated based on the slope status.

For the purpose of illustration, throughout this application, mapping tables or data structures are utilized to describe the embodiments of the invention. However, the mapping tables can be implemented as a part of a machine-learning predictive or determination models. The inputs provided to a predictive or determination model can include a control command and a driving parameter, and an output of the predictive or determination model can be a slope status. There can be a pitch/command predictive model and a roll/command predictive model. Inputs to a pitch/command predictive model can include a speed control command (e.g., throttle or brake command) and a driving parameter (e.g., speed, acceleration or deceleration), and an output of the pitch/command model can be a pitch status of the road (e.g., a longitudinal grade/slope percentage or angle). Inputs to a roll/command predictive model can include a steering command and a heading direction, and an output of the roll/command predictive model can be a roll status of the road (e.g., a cross grade/slope percentage or angle).

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 11:
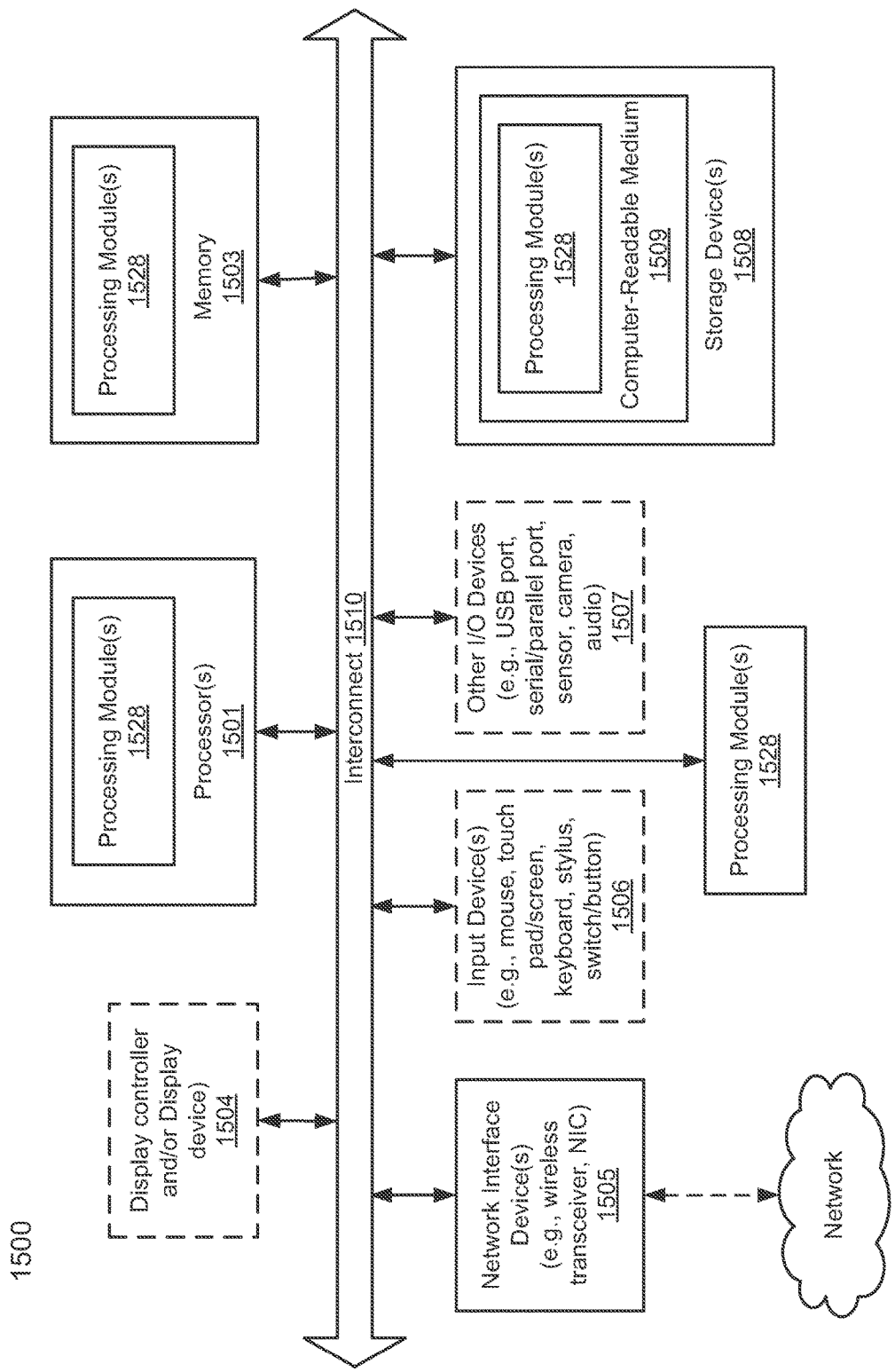
FIG. 11 is a block diagram illustrating a data processing system according to one embodiment.

FIG. 11 is a block diagram illustrating an example of a data processing system which may be used with one embodiment of the invention. For example, system 1500 may represent any of data processing systems described above performing any of the processes or methods described above, such as, for example, perception and planning system 110, any of servers 103-104 of FIG. 1, or map update server 900 of FIG. 9. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 304, control module 305, slope processing module 308, and/or map update module 309. Alternatively, processing module/unit/logic 1528 may represent data collector 911, data analysis module 912, map updater 913, and/or map merger 914. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for updating maps for autonomous driving, the method comprising:
   recording a first driving parameter of an autonomous driving vehicle (ADV) driving on a segment of a road in response to a first control command issued autonomously at the ADV;
   determining a difference between the first driving parameter and a target driving parameter corresponding to the first control command;
   issuing a second control command autonomously at the ADV to compensate and cause the ADV to drive with a second driving parameter closer to the target driving parameter, in response to determining that the difference exceeds a predetermined threshold;
   deriving a slope status of the segment of the road based on at least the second control command; and
   updating map data of a map corresponding to the segment of the road based on the derived slope status.

2. The method of claim 1, wherein deriving a slope status of the segment of the road comprises:
   performing a lookup operation in a slope to command (slope/command) mapping table to search and locate a mapping entry that approximately matches the second control command and the target driving parameter; and
   obtaining the slope status from the matching entry of the slope/command table.

3. The method of claim 2, wherein the slope/command mapping table comprises a plurality of mapping entries, wherein each mapping entry maps a particular control command and a driving parameter to a particular slope status.

4. The method of claim 3, wherein the slope/command mapping table was created based on driving statistics of a plurality of vehicles driving on a plurality of types of roads with different slope statuses, wherein driving statistics records control commands issued to the vehicles and responses from the vehicles at different points in time.

5. The method of claim 3, wherein a control command of each mapping entry was issued in order to maintain a vehicle to drive according to a corresponding driving parameter of the mapping entry.

6. The method of claim 1, wherein the slope status comprises at least one of a pitch status or a roll status.

7. The method of claim 1, wherein the first and second control commands are at least one of a speed control command or a steering command.

8. A non-transitory machine-readable medium having instructions stored therein, which when executed by a processor, cause the processor to perform operations, the operations comprising:
  recording a first driving parameter of an autonomous driving vehicle (ADV) driving on a segment of a road in response to a first control command issued autonomously at the ADV;
  determining a difference between the first driving parameter and a target driving parameter corresponding to the first control command;
  issuing a second control command autonomously at the ADV to compensate and cause the ADV to drive with a second driving parameter closer to the target driving parameter, in response to determining that the difference exceeds a predetermined threshold;
  deriving a slope status of the segment of the road based on at least the second control command; and
  updating map data of a map corresponding to the segment of the road based on the derived slope status.

9. The machine-readable medium of claim 8, wherein deriving a slope status of the segment of the road comprises:
  performing a lookup operation in a slope to command (slope/command) mapping table to search and locate a mapping entry that approximately matches the second control command and the target driving parameter; and
  obtaining the slope status from the matching entry of the slope/command table.

10. The machine-readable medium of claim 9, wherein the slope/command mapping table comprises a plurality of mapping entries, wherein each mapping entry maps a particular control command and a driving parameter to a particular slope status.

11. The machine-readable medium of claim 10, wherein the slope/command mapping table was created based on driving statistics of a plurality of vehicles driving on a plurality of types of roads with different slope statuses, wherein driving statistics records control commands issued to the vehicles and responses from the vehicles at different points in time.

12. The machine-readable medium of claim 10, wherein a control command of each mapping entry was issued in order to maintain a vehicle to drive according to a corresponding driving parameter of the mapping entry.

13. The machine-readable medium of claim 8, wherein the slope status comprises at least one of a pitch status or a roll status.

14. The machine-readable medium of claim 8, wherein the first and second control commands are at least one of a speed control command or a steering command.

15. A data processing system, comprising:
  a processor; and
  a memory coupled to the processor to store instructions, which when executed by the processor, cause the processor to perform operations, the operations including
  recording a first driving parameter of an autonomous driving vehicle (ADV) driving on a segment of a road in response to a first control command issued autonomously at the ADV,
  determining a difference between the first driving parameter and a target driving parameter corresponding to the first control command,
  issuing a second control command autonomously at the ADV to compensate and cause the ADV to drive with a second driving parameter closer to the target driving parameter, in response to determining that the difference exceeds a predetermined threshold,
  deriving a slope status of the segment of the road based on at least the second control command, and
  updating map data of a map corresponding to the segment of the road based on the derived slope status.

16. A computer-implemented method for updating maps for autonomous driving, the method comprising:
  receiving driving statistics of a plurality of vehicles recorded when the vehicles were driving on a plurality of roads, wherein the driving statistics includes control commands issued to the vehicles and responses of the vehicles in response to the control commands at different points in time;
  for a given segment of a road, identifying one or more control commands that were issued to one or more of the vehicles to compensate prior control commands of the vehicles in order for the vehicles to maintain one or more target driving parameters associated with the control commands;
  deriving a slope status of the segment of the road based on the control commands and the target driving parameters; and
  updating map data of a map location of a map corresponding to the segment of the road.

17. The method of claim 16, wherein deriving a slope status of the segment of the road comprises:
  for each of the control commands and a corresponding target riving parameter,
    performing a lookup operation in a slope to command (slope/command) mapping table to search and locate a mapping entry that approximately matches the second control command and the target driving parameter, and
    obtaining the slope status from the matching entry of the slope/command table.

18. The method of claim 17, wherein the slope/command mapping table comprises a plurality of mapping entries, wherein each mapping entry maps a particular control command and a driving parameter to a particular slope status.

19. The method of claim 18, wherein the slope/command mapping table was created based on driving statistics of a plurality of vehicles driving on a plurality of types of roads with different slope statuses, wherein driving statistics records control commands issued to the vehicles and responses from the vehicles at different points in time.

20. The method of claim 18, wherein a control command of each mapping entry was issued in order to maintain a vehicle to drive according to a corresponding driving parameter of the mapping entry.

* * * * *